United States Patent [19]

Hovden et al.

[11] Patent Number: 4,723,501
[45] Date of Patent: Feb. 9, 1988

[54] ARRANGEMENT IN A FLOATING BODY FOR USE DURING BOREHOLE-SEISMIC MEASUREMENTS

[75] Inventors: Torbjørn Hovden, Hovdebygda; Inge Dragsund, Ulsteinvik, both of Norway; Oddbjørn Hjelle, Houston, Tex.

[73] Assignee: Geco Well Services A.S., Sandivika, Norway

[21] Appl. No.: 869,715

[22] Filed: Jun. 2, 1986

[30] Foreign Application Priority Data

Jun. 4, 1986 [NO] Norway ................................ 852249

[51] Int. Cl.$^4$ ............................................. B63B 21/00
[52] U.S. Cl. .................... 114/144 B; 367/16; 114/230
[58] Field of Search .............. 114/219, 230, 144 B; 440/38, 39; 405/52, 211; 367/15–19

[56] References Cited

U.S. PATENT DOCUMENTS

| 3,139,060 | 6/1964 | Dane ........................................ 440/39 |
| 3,215,202 | 11/1965 | Pollard et al. . |
| 3,339,516 | 9/1967 | Lenci ........................................ 440/39 |
| 3,368,192 | 2/1968 | Postlewaite . |
| 3,563,043 | 2/1971 | Nelson . |
| 3,585,802 | 6/1971 | Frankel .................................. 114/230 |
| 4,320,989 | 3/1982 | Mamo ...................................... 405/52 |
| 4,660,184 | 4/1987 | Haukjem ................................ 367/16 |

Primary Examiner—Sherman D. Basinger
Assistant Examiner—Stephen P. Avila
Attorney, Agent, or Firm—Holman & Stern

[57] ABSTRACT

An arrangement for spacing a floating body from a mother vessel during borehole-seismic measurements, wherein the floating body includes at least two buoyant bodies connected by a rigid framework and which supports the seismic equipment, the floating body is maintained in a correct position for transmitting seismic pulses by a crane or boom mounted on the mother vessel, a tube or hose system is mounted on the framework for ejecting a pressurized medium, preferably water, against the side of the vessel through nozzles, and the pressurized medium is transferred to the system through a hose coupled to a source of pressurized fluid on board the vessel.

12 Claims, 2 Drawing Figures

ARRANGEMENT IN A FLOATING BODY FOR USE DURING BOREHOLE-SEISMIC MEASUREMENTS

BACKGROUND OF THE INVENTION

1. Field of the Invention

The invention relates to an arrangement for keeping a floating body spaced from a mother vessel, which floating body is intended for use during borehole-seismic measurements for supporting the seismic equipment and comprises at least two buoyant bodies connected by means of a rigid framework construction.

2. Description of the Prior Art

A floating body of this type is disclosed in Norwegian Patent Application No. 84 3010, filed July 25, 1984, corresponding to U.S. patent application Ser. No. 758,740, filed July 25, 1985, now U.S. Pat. No. 4,660,174. The device described in this known publication consists of two buoyancy bodies which are rigidly connected by means of a steel framework construction. Below each buoyant body a seismic signal transmitter, preferably an air gun of known type is suspended. The above mentioned publication relates to apparatus used for raising these air guns to a position directly under the buoyant bodies when the floating body is taken on board a ship. The floating body will be maintained in a correct position in relation to the borehole which is to be analyzed by suspending it from a crane or boom extending from a vessel.

During use of this type of apparatus some problems have arisen, as the floating bodies can move too close to the ship's side and possibly strike against it, caused by drift or waves in the sea. Such changes in position and impact are very disadvantageous and can adversely influence the emission of signals or make such emission impossible, with the result that it will be necessary to stop the measurements and wait for more favorable conditions.

BRIEF DESCRIPTION OF THE INVENTION

The object of the present invention is to provide an arrangement by means of which the above problems can be avoided. This object is achieved by an arrangement according to the invention which maintains the floating body with the suspended air guns at a suitable distance from the sides of the ship, for example at a distance of 20 m. The distance can be adapted according to what is desired, by means of the towing connection which will define the maximum distance. The invention utilizes nozzles having openings preferably about 20 to 30 cms below the water surface.

The preferred injection medium for the nozzles is water, especially sea water, but it will also be possible to use other mediums such as air. An injection of air into the water may, however, give unwanted side effects.

BRIEF DESCRIPTION OF THE DRAWINGS

The invention will now be described in detail with reference to the accompanying drawings wherein.

DETAILED DESCRIPTION OF THE PREFERRED EMBODIMENT

The arrangement according to the invention has been mounted on a floating body, for example of the type described in the prior art referred to above. The floating body and its construction is indicated schematically as including two buoyant bodies 1, which are connected together by means of a rigid trusswork, or framework, construction made of steel. Below the buoyant bodies 1 there are suspended air guns 3, which can be raised and lowered by means of a control line arrangement 4 which is connected to the suspension line 5 which is connected to a crane or boom on board a vessel.

Figure 1:
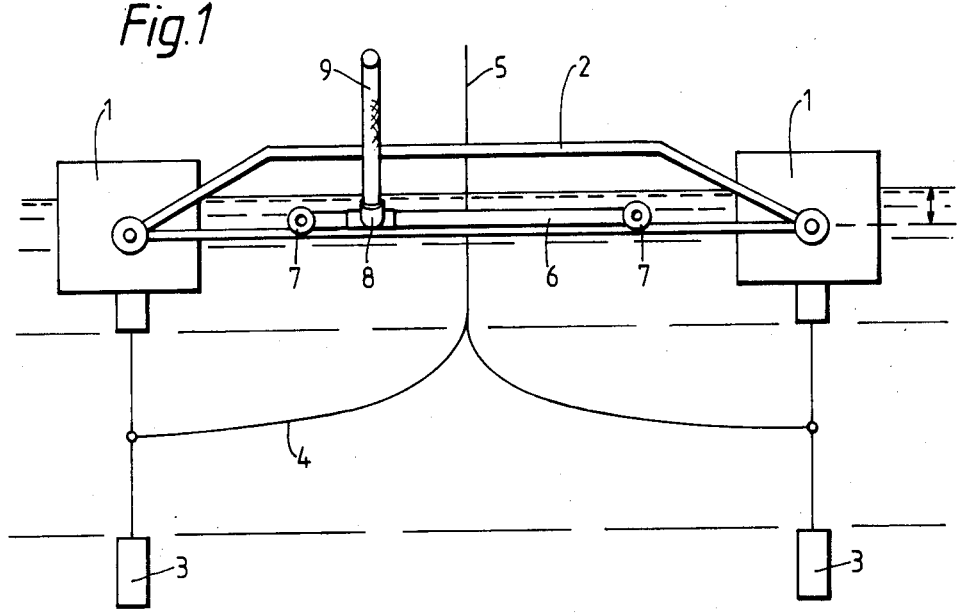
FIG. 1 is a schematic elevational view of the invention.
Figure 2:
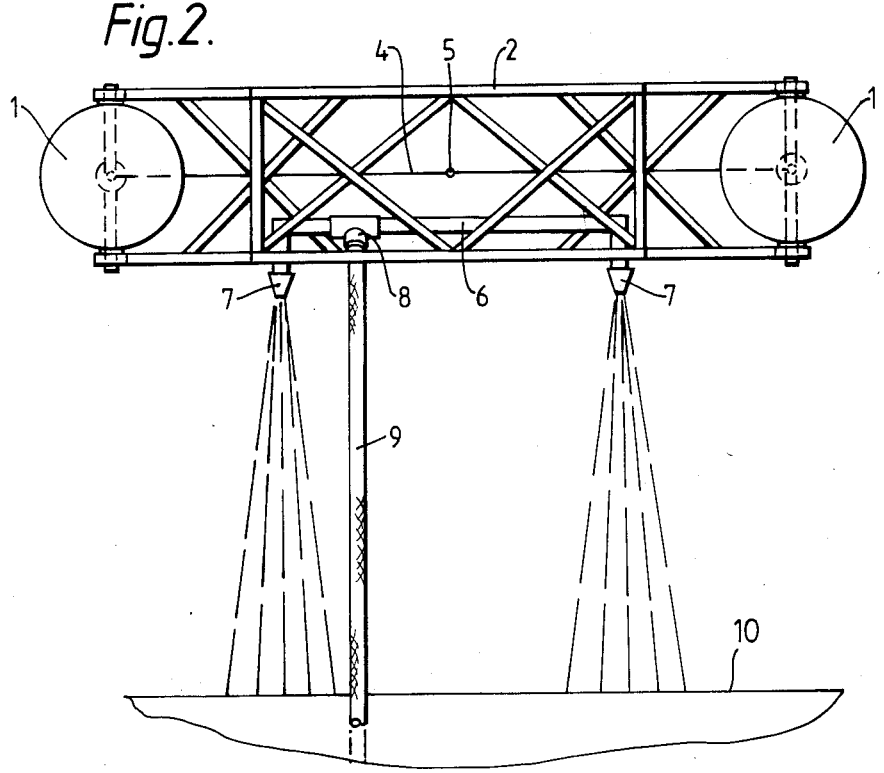
FIG. 2 is a top plan view of FIG. 1.

FIG. 2 which shows the construction as viewed from above, illustrates a possible embodiment of the trusswork construction. Many different modifications will however, be possible and the details of the construction 2 are not of importance with respect to the invention. The main feature of the invention is the provision of a pressure medium-ejecting system which consists of a tube or hose type conduit system 6 which in a suitable way has been mounted on the framework 2 and which leads to, in the embodiment shown, two nozzles 7 for ejecting pressure media. The tube or hose system 6 is provided with a coupling 8 for connecting to a hose 9 which leads to a source of pressure medium, which in the preferred embodiment is the pump system on board the vessel which supports the floating body. The conduit system can be rigid or flexible. The hose 9 will, however, preferably be flexible. In the preferred embodiment, water with a pressure of 6 to 9 kg/cm$^2$ is fed through the hose 9 to the conduit system 6 and thereby to the nozzles 7 which are placed parallel to each other and are directed away from the framework 2 of the floating body and against the side of the ship 10. The water is ejected from the nozzles substantially parallel to the surface of the wter at a rate of 5 to 100 m$^3$/hr and will, as a result of this pressure maintain the floating body at a minimum distance from the ship and thus fulfill the intended objective. The conduit system 6 is preferably placed under the water surface, but can, of course, also be positioned higher; the nozzles, however, should be at least 20 to 30 cms below the water surface. It has been found that this is the most favorable positioning of the nozzles, although a position with a small angle in relation to the horizontal is acceptable. The nozzles can be of a known type and the of supporting the system on the floating body as well as the assembly of the system can be made by a person skilled in the art. In the illustrated embodiment the use of two ejection nozzles is described. However, it is also possible to use a different number of nozzles.

We claim:

1. Arrangement for keeping a floating body floating in water spaced from a mother vessel supporting the floating body, the floating body being used for supporting seismic equipment during borehole-seismic measurements and including at least two spaced buoyant bodies connected by a rigid framework, comprising:

a tubular conduit system for a pressurized fluid mounted on said floating body;

coupling means connected to said tubular conduit system for connecting said tubular conduit system to a source of pressurized fluid; and at least one nozzle connected to and communicating with said tubular conduit system for receiving and ejecting pressurized fluid fed through said conduit system, said nozzle being positioned to eject pressurized fluid away from the floating body in a direction substantially parallel to and at a distance of 20 to 30 centimeters below the surface of the water and against the mother vessel.

2. Arrangement as claimed in claim 1 wherein:
said at least one nozzle comprises two nozzles positioned in spaced relationship with respect to each other adjacent the buoyant bodies.

3. Arrangement as claimed in claim 1 and further comprising:
a source of fluid at a pressure substantially in the range of 6 to 9 kg/cm$^2$;
said at least one nozzle being of a size capable of ejecting said pressurized fluid at a flow rate substantially in the range of 5 to 100 m$^3$/hr.

4. Arrangement as claimed in claim 2 and further comprising:
a source of fluid at a pressure substantially in the range of 6 to 9 kg/cm$^2$;
said nozzles being of a size capable of ejecting said pressurized fluid at a flow rate substantially in the range of 5 to 100 m$^3$/hr.

5. Arrangement as claimed in claim 1 wherein:
said tubular conduit system is mounted on said framework and comprises an assembly of fire hoses.

6. Arrangement as claimed in claim 4 wherein:
said tubular conduit system is mounted on said framework and comprises an assembly of fire hoses.

7. Arrangement as claimed in claim 1 wherein:
a source of pressurized fluid is provided comprising a pumping system supported on the mother vessel for pumping sea water.

8. Arrangement as claimed in claim 7 wherein:
said pumping system produces a fluid pressure substantially in the range of 6 to 9 kg/cm$^2$; and
said at least one nozzle is of a size capable of ejecting said pressurized fluid at a flow rate substantially in the range of 5 to 100 m$^3$/hr.

9. Arrangement as claimed in claim 8 wherein:
said at least one nozzle comprises two nozzles positioned in spaced relationship with respect to each other adjacent the buoyant bodies and having a size capable of ejecting said pressurized fluid at said substantially 5 to 100 m$^3$/hr.

10. Arrangement as claimed in claim 1 wherein:
a source of pressurized fluid is provided comprising sea water.

11. Arrangement as claimed in claim 3 wherein:
said source of pressurized fluid comprises sea water.

12. Arrangement as claimed in claim 4 wherein:
said source of pressurized fluid comprises sea water.

* * * * *